United States Patent [19]
St. John et al.

[11] Patent Number: 5,911,505
[45] Date of Patent: Jun. 15, 1999

[54] STAND MIXER WITH SHAFT COUPLING

[75] Inventors: Robert A. St. John, Cheshire, Conn.;
Ngai Ming Leung, Kwai Fong, China;
Charles Z. Krasznai, Fairfield, Conn.;
John D. McNair, Yuen Long, China

[73] Assignee: HP Intellectual Corp., Wilmington, Del.

[21] Appl. No.: 09/201,184

[22] Filed: Nov. 30, 1998

[51] Int. Cl.⁶ .......................... A47J 43/044; A47J 43/08
[52] U.S. Cl. .......................... 366/200; 366/222; 464/161
[58] Field of Search ................ 366/92–95, 100, 366/197, 199–201, 222–224, 331; 464/93, 160, 161; 403/354, 364; 192/66.31, 69.8, 69.81

[56] References Cited

U.S. PATENT DOCUMENTS

| | | |
|---|---|---|
| 962,567 | 6/1910 | Hancock . |
| 1,290,045 | 1/1919 | Bachman .................................. 366/95 |
| 1,650,557 | 11/1927 | Weingartner . |
| 1,867,243 | 7/1932 | Aastrup ...................... 366/95 |
| 2,185,155 | 12/1939 | Meeker et al. . |
| 2,278,187 | 3/1942 | Strauss et al. . |
| 2,366,461 | 1/1945 | Shoreys . |
| 2,398,570 | 4/1946 | Wildhaber . |
| 2,437,207 | 3/1948 | Noxon . |
| 2,438,465 | 3/1948 | Strauss et al. . |
| 2,512,407 | 6/1950 | Wood . |
| 2,525,585 | 10/1950 | Brasington .............................. 366/222 |
| 2,552,605 | 5/1951 | Van Guilder . |
| 2,616,673 | 11/1952 | Van Guilder . |
| 2,720,765 | 10/1955 | Drexler . |
| 2,742,127 | 4/1956 | Mumford . |
| 2,755,900 | 7/1956 | Seyfried . |
| 2,794,627 | 6/1957 | Rodwick . |
| 2,811,338 | 10/1957 | Beam ........................................ 366/95 |
| 2,830,445 | 4/1958 | Kressin . |
| 2,892,327 | 6/1959 | Kressin . |
| 2,917,929 | 12/1959 | Sprague . |
| 2,992,715 | 7/1961 | Blachly . |
| 3,545,585 | 12/1970 | Eaton . |
| 3,713,628 | 1/1973 | Christensen . |
| 3,951,351 | 4/1976 | Ernster et al. . |
| 4,071,789 | 1/1978 | Ernster et al. . |
| 4,176,971 | 12/1979 | Ernster et al. .......................... 366/298 |
| 4,325,643 | 4/1982 | Scott et al. .............................. 366/200 |
| 4,403,867 | 9/1983 | Duke ....................................... 366/199 |
| 4,422,343 | 12/1983 | Falkenbach et al. . |
| 4,891,034 | 1/1990 | Wilhelmsen .............................. 464/87 |
| 4,919,539 | 4/1990 | Drocco ................................... 366/224 |
| 4,993,992 | 2/1991 | Kriegel ................................... 464/137 |
| 5,000,578 | 3/1991 | Artin et al. ............................. 366/297 |
| 5,022,645 | 6/1991 | Green ...................................... 403/354 |
| 5,338,111 | 8/1994 | Trocherie et al. ...................... 366/205 |
| 5,524,530 | 6/1996 | Nijzingh et al. . |

FOREIGN PATENT DOCUMENTS

| | | | |
|---|---|---|---|
| 1059633 | 6/1959 | Germany ............................... 366/199 |
| 2214742 | 10/1973 | Germany ............................... 366/199 |
| 4853 | of 1905 | United Kingdom ..................... 366/95 |
| 21491 | of 1911 | United Kingdom ..................... 366/94 |

*Primary Examiner*—Charles E. Cooley
*Attorney, Agent, or Firm*—Barry E. Deutsch

[57] ABSTRACT

A stand mixer comprising a drive shaft, a transmission shaft, and a coupling. The drive shaft is rotatably held in a first housing. The transmission shaft is held in a second housing. The second housing is pivotally mounted to the first housing so that the first housing may be pivoted relative to the second housing. The coupling connects the drive shaft to the transmission shaft when the first housing is in an operating position. The coupling includes a self aligning coupling. The self aligning coupling comprises a first member, a second member and a spring. The first member is inserted into and intermeshed with the second member to transfer power between the drive shaft and the transmission shaft. When the first housing is pivoted to the operating position the spring biases the first member against the second member to intermesh the first member with the second member.

20 Claims, 6 Drawing Sheets

STAND MIXER WITH SHAFT COUPLING

BACKGROUND OF THE INVENTION

1. Field of the Invention

The present invention relates to stand mixers and, more particularly, to a stand mixer with a rotating bowl.

2. Prior Art

Examples of stand mixers having an upper housing, a lower housing and means of coupling a motor in one of the two housings to drive means in the other housing are disclosed in U.S. Pat. Nos.: 5,000,578; 4,325,643; 4,176,971; 4,071,789; 3,951,351; 2,438,465 and 2,278,187.

SUMMARY OF THE INVENTION

In accordance with a first embodiment of the present invention a stand mixer is provided. The stand mixer comprises a drive shaft, a transmission shaft and a coupling. The drive shaft is rotatably held in a first housing. The transmission is held in a second housing. The second housing is pivotably mounted to the first housing. The first housing may be pivoted relative to the second housing. The coupling connects the drive shaft to the transmission shaft when the first housing is in an operating position. The coupling comprises a first member, a second member, and a spring. The first member is inserted into and intermeshed with the second member to transfer power between the drive shaft and the transmission shaft. When the first housing is pivoted to the operating position the spring biases the first member against the second member to intermesh the first member with the second member.

In accordance with a second embodiment of the present invention a stand mixer is provided. The stand mixer comprises a lower housing, an upper housing and a coupling. The upper housing is pivotably mounted to the lower housing. The upper housing may be pivoted between a lower position and a raised position. The upper housing has a drive shaft therein to drive a transmission shaft in the lower housing. The coupling connects the drive shaft to the transmission shaft when the upper housing is in a lower position. The coupling includes an on-the-fly alignment coupling. The on-the-fly alignment coupling comprises a keyed member, a keyway member, and a spring. The keyed member is movably mounted to the drive shaft. The keyway member is fixedly mounted to the transmission shaft. The keyway member has a keyway adapted to receive the keyed member therein. The spring biases the keyed member towards the keyway member. When the upper housing is pivoted to the lower position, the keyway member compresses the spring. The spring forces the keyed member down and inserts the keyed member into the keyway member on-the-fly.

In accordance with a third embodiment of the present invention, a stand mixer is provided. The stand mixer comprises a drive shaft, a transmission shaft, a first coupling, and a second coupling. The drive shaft is mounted in an upper housing. The transmission shaft is driven by the drive shaft. The transmission shaft is held in a lower housing. The upper housing is pivotably mounted to the lower housing to be pivoted between a lower position and a raised position. The first coupling is mounted on the drive shaft. The first coupling couples an upper drive shaft portion to the lower drive shaft portion. The second coupling drivingly connects the drive shaft to the transmission shaft. The second coupling comprises a first coupler, a second coupler and a spring. The first coupler is mounted to the drive shaft. The second coupler is mounted to the transmission shaft. The second coupler is intermeshed with the first coupler to transfer power from the drive shaft to the transmission shaft. The spring is adapted to be deflected when pivoting the upper housing to the lowered position. The deflected spring biases the first coupler against the second coupler to mesh the first coupler with the second coupler.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
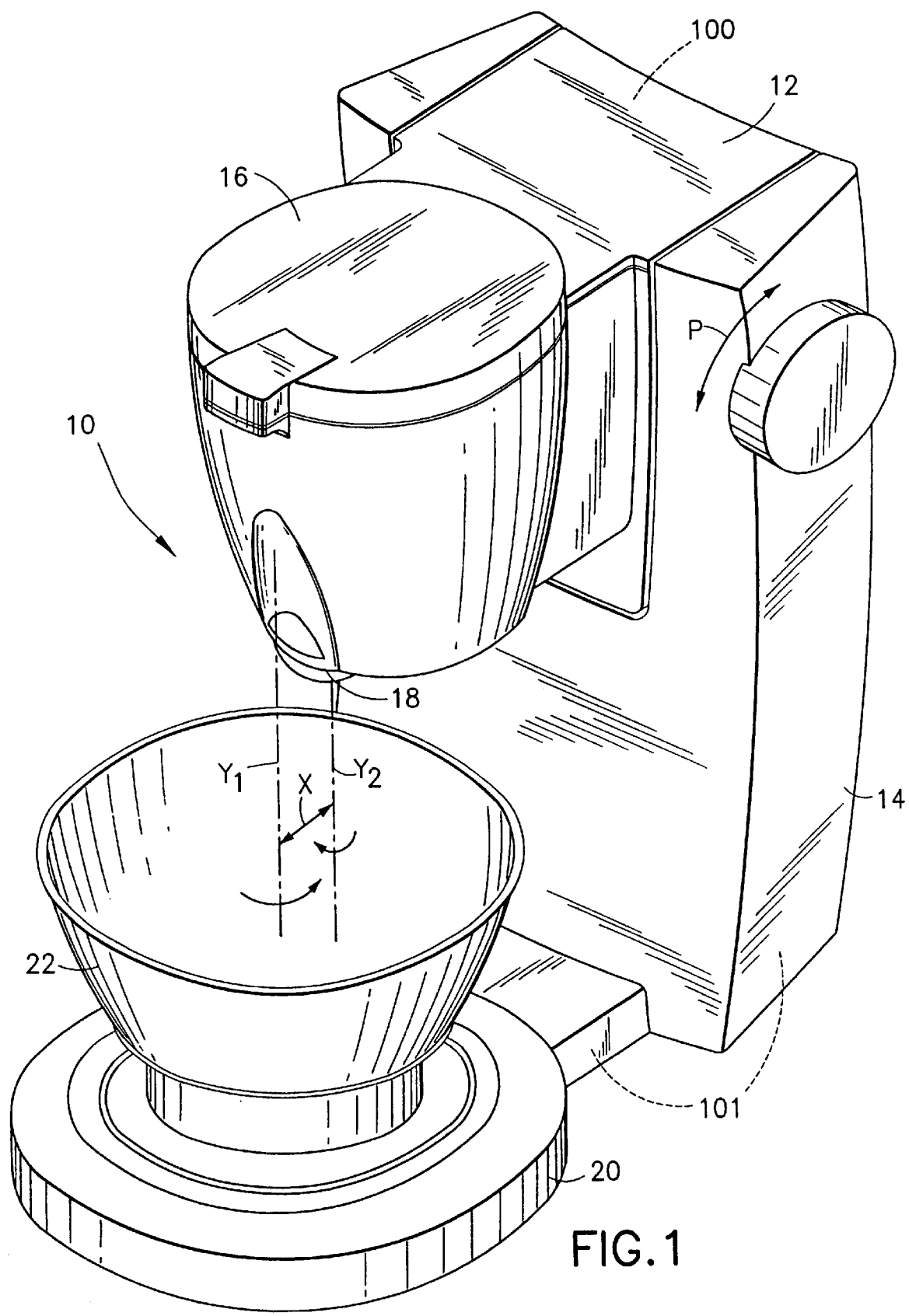
FIG. 1 is a perspective view of a stand mixer incorporating features of the present invention.

Referring to FIG. 1, there is shown a perspective view of a stand mixer 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

The stand mixer 10 comprises an upper housing 12 and a lower housing 14. The upper housing 12 has an offset head section 16 with a chuck 18 adapted to generally hold a tool or implement 24 therein (see also FIG. 2). The lower housing 14 has a support pad 20 which supports a mixing bowl 22. The mixing bowl 22 is located generally under the head section 16 of the upper housing 12, so that implements 24 held by the chuck 18 extend into the mixing bowl 22. The mixing bowl is removably mounted to the support pad 20. The upper housing 12 is pivotably mounted to the lower housing 14. This allows the upper housing 12 to be pivoted up and down relative to the lower housing 14 as indicated by arrows P in FIG. 1. In the preferred embodiment, the upper housing 12 may be pivoted up about 90° relative to the lower housing 14. In alternate embodiments, the pivot range between the up and down positions of the upper housing may be different. The upper housing is pivoted up to insert or remove implements 24 from the chuck 18. Also, when the upper housing is in the up position, the mixing bowl 22 may be removed or placed on the support pad 20. The upper housing 12 is rotated down to lower the implement held by the chuck 18 into the bowl 22 on the support pad 20 of the lower housing. The chuck 18 is rotatably mounted to the head section 16 to rotate the implement held by the chuck about an axis of rotation Y2. The support pad 20 has a rotatable mount 26 (see FIG. 2) to which the mixing bowl 22 is affixed when placed on the support pad 20. The rotatable mount 26 rotates the mixing bowl 22 about axis of rotation Y1 relative to support pad 20. The axis of rotation Y1 of the mixing bowl 22 is offset relative to a center axis Y2 of the chuck 18 on the head section 16 by a predetermined lateral distance X (see FIG. 1). The mixing bowl 22 and the tool in the chuck 18 rotate when the stand mixer 10 is operated.

Figure 2:
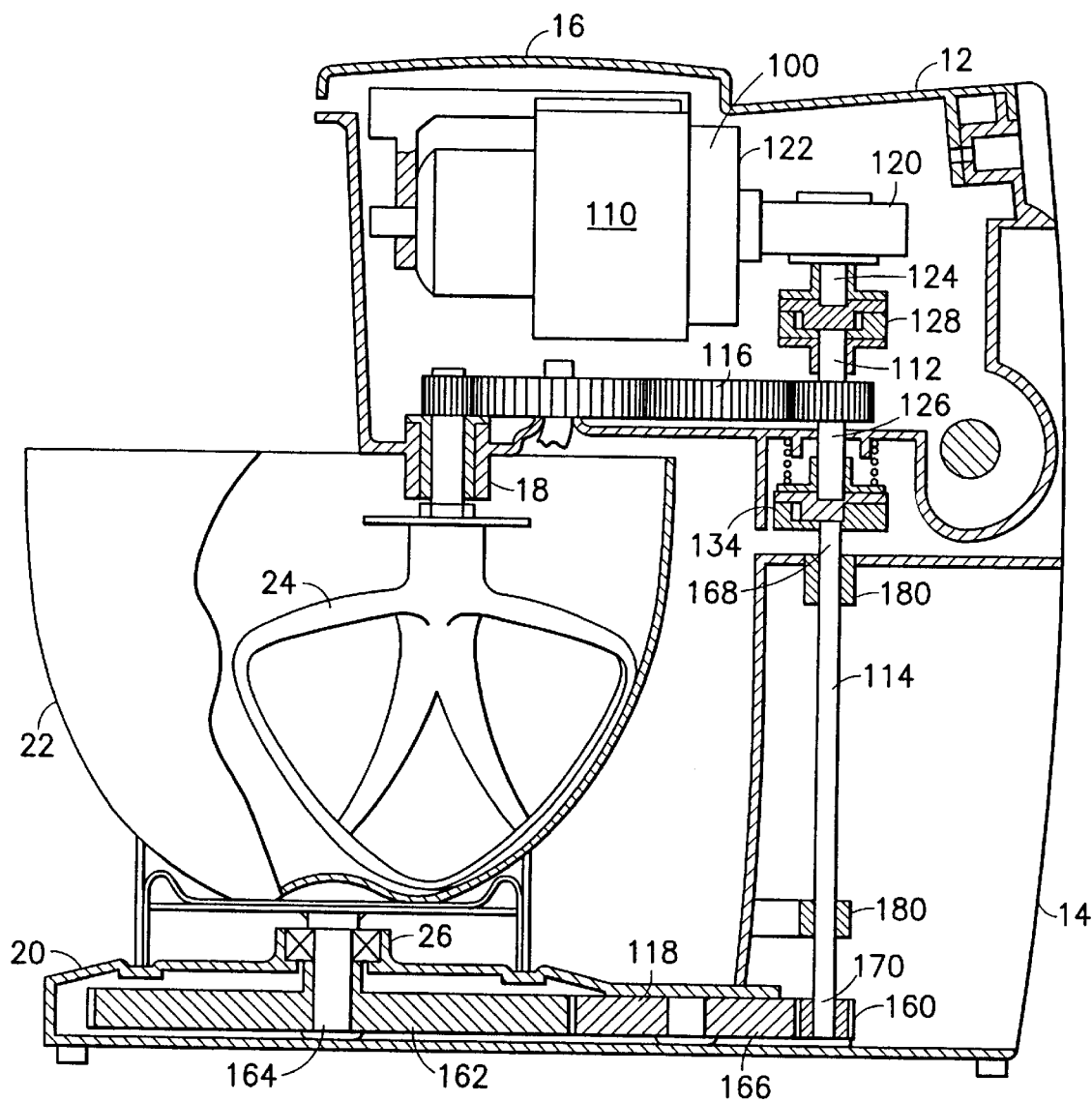
FIG. 2 is a cross-sectional elevation view of the stand mixer in FIG. 1, showing an internal drive system of the stand mixer.

Referring now also to FIG. 2, the stand mixer 10 has a drive system 100. The drive system 100 is internal to the stand mixer 10. The drive system 100 drives both the implement 24 in the rotatable chuck 18 and the mixing bowl 22 on the rotatable mount 26 of the support pad 20. The drive system 100 generally comprises an electric motor 110, a drive shaft assembly 112, a transmission shaft 114, an upper transmission system 116, a lower transmission system 118 and a main coupling 134. The drive shaft assembly 112 is powered substantially directly from the electric motor 110. The upper transmission system 116 transfers power from the drive shaft assembly 112 to the rotatable chuck 18 in the upper housing 12 to rotate the implement 24 held by the chuck. The lower transmission system 118 delivers power from the transmission shaft 114 to the rotatable mount 26 to rotate the mixing bowl 22 mounted thereto. The electric motor 110, the drive shaft assembly 112 and the upper transmission system 116 are mounted to the upper housing 12. The transmission shaft 114 and the lower transmission system 118 are mounted to the lower housing 14. The main coupling 134 couples the drive shaft assembly 112 in the upper housing 12 to the transmission shaft 114 in the lower housing 14 of the stand mixer 10 when the upper housing 12 is in the down position (see also FIG. 2A). When the upper housing 12 is pivoted upwards relative to the lower housing (see FIG. 2B), the main coupling 134 is decoupled, and the motor 110, the drive shaft assembly 112 and the upper transmission system 116 are pivoted upwards with the upper housing 12.

The electric motor 110 of the drive system 100 is mounted generally inside the head section 16 of the upper housing 12. As shown in FIG. 2, the electric motor 110 is mounted in a generally horizontal position over the rotatable chuck 18. The electric motor 110 has a quill shaft 120 projecting from the rear end 122. The drive shaft assembly 112 and the transmission shaft 114 are substantially vertically mounted, generally behind the electric motor 110. Thus, in the preferred embodiment, the drive shaft assembly 112 and the transmission shaft 114 are orientated at an angle of about 90° relative to the quill shaft 120 of the electric motor 110. In alternate embodiments, the electric motor and the drive shaft assembly of the drive system may be orientated at any other suitable angle relative to each other ranging from being substantially parallel to being angled at about 90°. When the upper housing 12 is in the down position, as shown in FIG. 2, the drive shaft assembly 112 and the transmission shaft 114 are generally aligned. The upper transmission system 116 extends generally horizontally between the drive shaft assembly 112 and the rotatable chuck 18. The lower transmission system 118 extends generally horizontally between the transmission shaft 114 and the rotatable mount 26 in the support pad 20 of the lower housing 14.

Figure 2A:
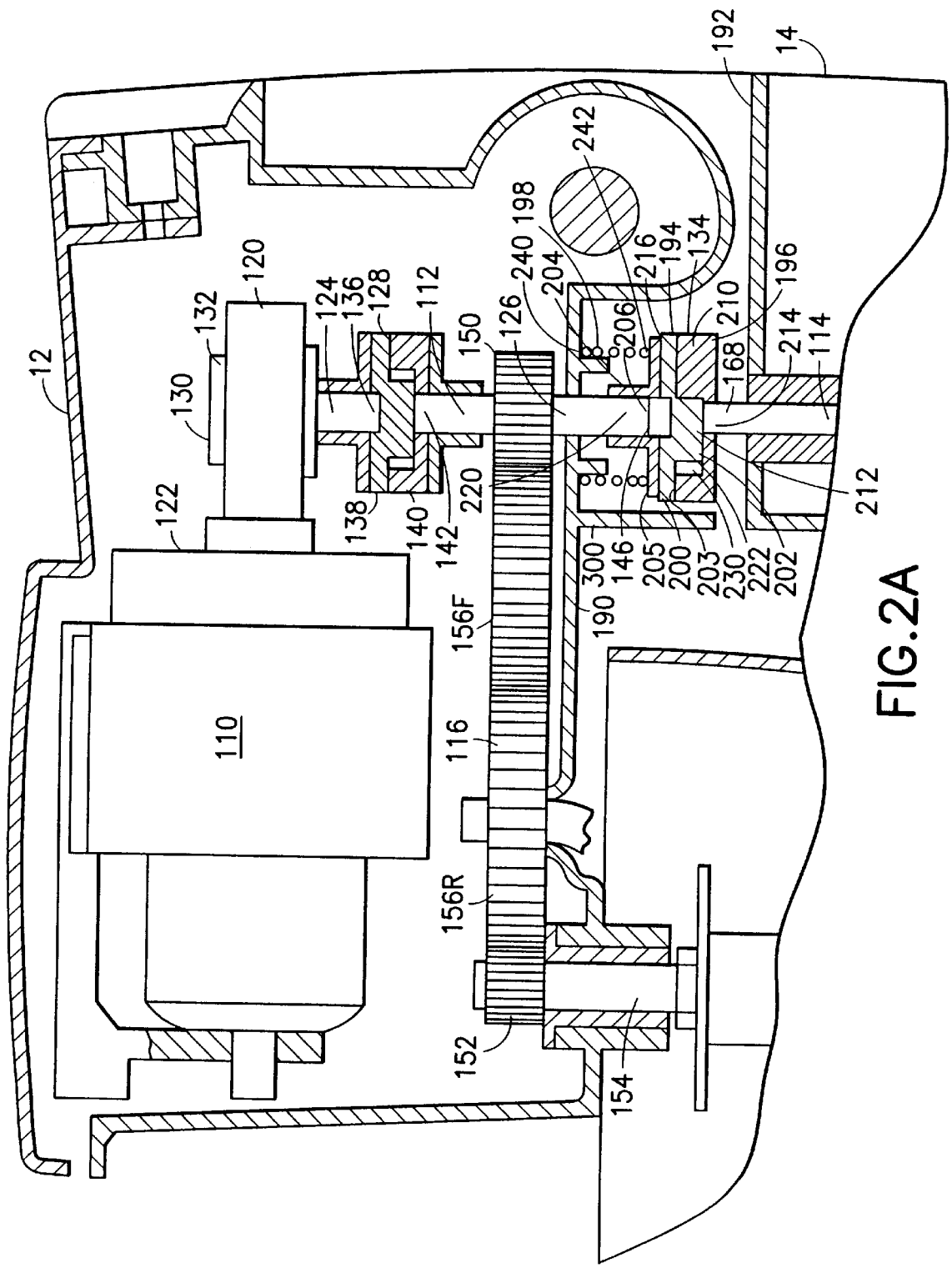
FIG. 2A is a first partial cross-sectional elevation view of the stand mixer in FIG. 1, showing an upper housing of the stand mixer and an upper portion of the drive system when the upper housing is in the down position.

Referring now to FIGS. 2 and 2A, the drive shaft assembly 112 comprises an upper drive shaft section 124, an intermediate coupling 128 and a lower drive shaft section 126. The upper and lower drive shaft sections 124, 126 are substantially aligned with each other. The intermediate coupling 128 mechanically connects the upper drive shaft section 124 to the lower drive shaft section 126 to transfer torque from the upper shaft section to the lower shaft section. Both upper and lower drive shaft sections 124, 126 are rotatably supported from the upper housing 12 by an appropriate number of bearings or bushings (not shown). The bearings carry the thrust and shear loads imparted to the upper and lower drive shaft sections 124, 126 by operation of the drive system 100. The upper drive shaft section 124 is engaged at its upper end 130 to the quill shaft 120 of the motor 110. In the preferred embodiment, the upper drive shaft section 124 has a worm gear 132 at the upper end 130 which meshes with a worm section on the quill shaft 120. In alternate embodiments, any other suitable system for transmitting torque between angled shafts may be used to engage the upper drive shaft section to the quill shaft of the motor. For example, the quill shaft may be provided at its end with a bevel gear which is mated to a bevel gear fixed to the upper end of the upper drive shaft section. At its bottom end 136, the upper drive shaft section 124 is connected to the intermediate coupling 128.

Still referring to FIGS. 2 and 2A, the intermediate coupling 128 comprises a male member 138 and a female member 140 which are generally interlocked to transfer torque from one member to the other. In the preferred embodiment, the male member 138 of the coupling 128 is connected to the lower end 136 of the upper drive shaft section 124 to rotate in unison with the upper shaft section. The male member 138 may otherwise have a keyed connection with the upper drive shaft section 124 which allows the male member to slide axially along the shaft section 124. Alternatively, the male member may be fixedly connected to the upper drive shaft to move in unison with the shaft. The bushings holding the upper shaft in this case may be adapted to allow the upper shaft to slide longitudinally within the upper housing. The female member 140 is fixedly connected to the upper end 142 of the lower drive shaft section 126 to move in unison with the lower shaft section. The intermediate coupling 128 may also include a spring (not shown) which biases the male member 138 against the female member 140. In an alternate embodiment, the relative positions of the male and female members of the intermediate coupling may be reversed. The male and female members 138, 140 of the intermediate coupling 128 will be described in greater detail below.

The lower drive shaft section 126 extends between the intermediate coupling 128 and the main coupling 134. The intermediate coupling 128 is located at the upper end 142, and the main coupling is located at the lower end 146 of the lower drive shaft section 126. The lower drive shaft section is drivingly connected to the upper transmission system 116 at a position on the lower shaft section generally between the intermediate coupling 128 and the main coupling 134 (see FIG. 2A). In the preferred embodiment, the upper transmission system 116 generally comprises a pinion 150 on the lower drive shaft section 126 drivingly connected to a spur gear 152 on the rotatable chuck 18 by a pair of intermediate idler gears 156F, 156R (see FIG. 2A). In an alternate embodiment, the upper transmission system may include any other suitable drive system for transferring torque between two laterally displaced shafts such as, a belt and pulley system, or a lateral transfer shaft extending between gears on the lower drive shaft section and the rotatable chuck. The pinion 150, the idler gears 156F, 156R and the spur gear 152 are arranged substantially in series. The pinion 150 is fixedly mounted to the lower drive shaft section 126 to rotate in unison with the shaft section. The spur gear 152 is fixedly mounted to a center shaft 154 of the rotatable chuck 18 to rotate in unison with the rotatable chuck. The pair of idler gears 156F, 156R are rotatably mounted in series to the upper housing 12 between the pinion 150 and the spur gear 152. (FIG. 2A shows schematically only the connection between the rear idler gear 156R and the upper housing 12.) The front idler 156F meshes with the pinion 150. The rear idler 156R meshes with the spur gear 152. Thus, when the drive system 100 is energized, rotation of the lower drive shaft section 126 rotates the pinion 150 which drives the front idler 156F. Rotation of the front idler 156F then drives the rear idler 156R which substantially directly turns the spur gear 152 and hence the shaft 154 of the rotatable chuck 18. The diameter ratios between the spur gear 152, the idler gears 156R, 156F and the pinion 150 are established to provide the implement 24 held in the rotatable chuck 18 with a predetermined torque.

Referring again to FIG. 2, the transmission shaft 114 extends from the main coupling 134 to the lower transmission system 118. The main coupling 134 is located at the upper end 168 of the transmission shaft 114. The bottom 170 of the transmission shaft 114 is drivingly engaged to the lower transmission system 118. The transmission shaft 114 is rotatably held in the lower housing 14 by a number of bearings or bushings 180 located to support thrust and shear loads applied to the transmission shaft 114 during operation of the drive system 100. The number of bearings used to support the transmission shaft and the locations of the bearings on the transmission shaft may be varied depending on the operational loading conditions to which the shaft is subjected. In the preferred embodiment, the lower transmission system 118 comprises a pinion 160 on the transmission shaft 114 drivingly connected to a spur gear 162 on the rotatable mount 26 by an idler gear 166. In an alternate embodiment, the lower transmission system may comprise any other suitable type of transmission system for transferring torque between laterally displaced shafts such as a belt and pulley system or a transfer shaft driven by worm or bevel gears. The pinion 160 on the transmission shaft 114, the idler 166 and the spur gear 162 on the rotatable mount 26 are arrayed substantially in series. The pinion 160 is fixedly mounted to the transmission shaft 114 to rotate in unison with the shaft 114. The spur gear 162 is fixedly mounted to a center shaft 164 of the rotatable mount 26 to rotate in unison with the center shaft. The idler gear 166 is rotatably mounted to the support pad 20 between the pinion 160 and the spur gear 162. The idler gear 166 meshes with the pinion 160 and with the spur gear 162 substantially diametrically opposite the pinion 160. When the drive system 100 is energized, the transmission shaft 114 rotates the pinion 160 which drives the idler gear 166. Rotation of the idler gear 166 in turn rotates the spur gear 162 and hence the center shaft 164 and rotatable mount 26. The three in line gear arrangement (i.e. pinion 160, idler 166 and spur 162) of the lower transmission 118 rotates the rotatable mount 26 in the same direction as the rotation of the transmission shaft 114 driving the lower transmission. For example, if the transmission shaft 114 is turning clockwise the rotatable mount 26 is also rotated clockwise by the lower transmission 118. In contrast, the four in line gear arrangement (i.e. pinion 150, front idler 156F, rear idler 156R and spur 152) of the upper transmission 116 (see FIG. 2A) drives the rotatable chuck 18 counter to the rotation of the lower drive shaft section 126 driving the upper transmission. In this case, if the lower drive shaft section 126 is turning clockwise, the rotatable chuck 18 is rotated counter-clockwise by the upper transmission 116. The lower drive shaft section 126 and the transmission shaft 114 rotate in the same direction when the drive system 100 is operated. Thus, in the preferred embodiment, the rotatable chuck 18 is counter-rotated relative to the rotatable mount 26. The implement 24 in the rotatable chuck 18 is counter-rotated relative to the mixing bowl 22 on the rotatable mount 26 when the stand mixer is operated.

Figure 2B:
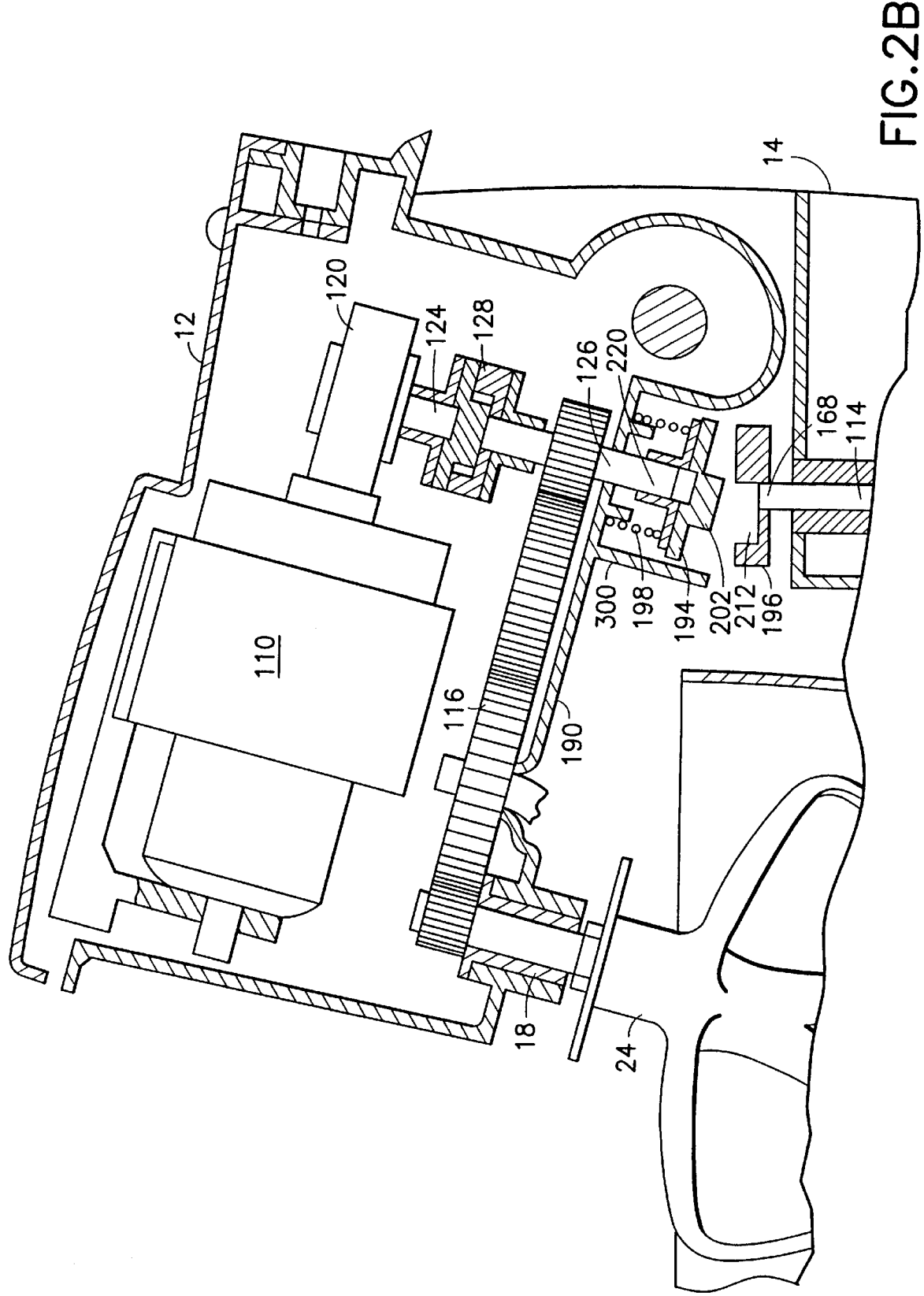
FIG. 2B is a second partial cross-sectional elevation view of the stand mixer showing the upper housing and the upper portion of the drive system when the upper housing is moving towards an up position.

Referring now to FIGS. 2A and 2B, the main coupling 134 connects the bottom 146 of the lower drive shaft section 126, of the drive shaft assembly 112, to the top 168 of the transmission shaft 114. In the preferred embodiment, the bottom 146 of the lower drive shaft section 126 extends down from the bottom 190 of the upper housing 12. The top 168 of the transmission shaft 114 extends up from the upper surface 192 of the lower housing 14. The main coupling 134 is thus located generally between the upper housing 12 and the lower housing 14. In alternate embodiments, the main coupling may otherwise be located either within the upper housing or the lower housing of the stand mixer. A rear face plate 300 cantilevers down from the upper housing 12 alongside the main coupling 134. The main coupling 134 generally comprises a male member 194, a female member 196 and a spring 198. The male member 194 is mounted to the bottom end 146 of the lower drive shaft section 126. The female member 196 is mounted to the upper end 168 of the transmission shaft 114. In alternate embodiments, the relative positions of the male and female members of the coupling may be reversed. The male member 194 is generally coupled and interlocked with the female member 196 when the upper housing 12 is in the down position shown in FIG. 2A. When the upper housing 12 is in the up position shown in FIG. 2B, the male member 194 is uncoupled from the female member 196. The spring 198 in the main coupling 134 is mounted between the male member 194 and the bottom 190 of the upper housing 12.

Figure 3:
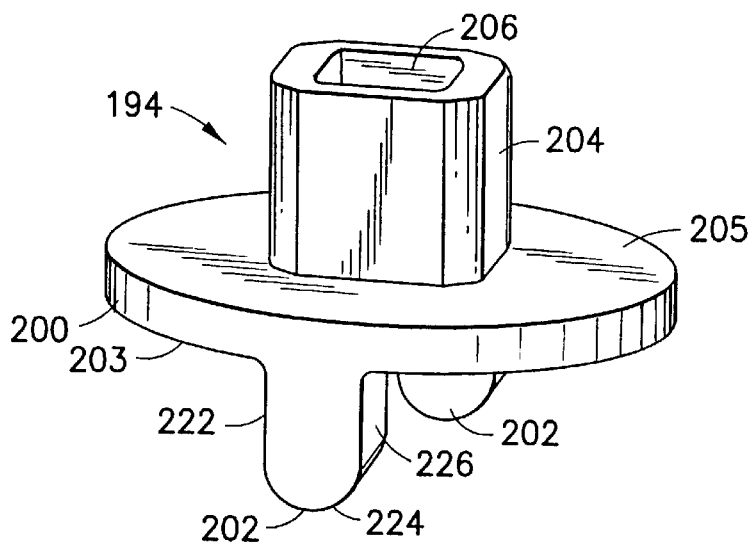
FIGS. 3–3B are respectively a first perspective view, a bottom plan view and a second perspective view of a male member of a main coupling in the drive system shown in FIG. 2, the male member being shown upside down in the second perspective view of FIG. 3B.
Figure 3A:
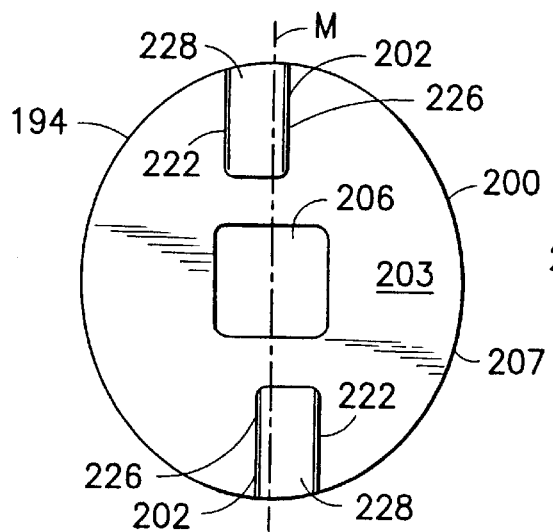
Figure 3B:
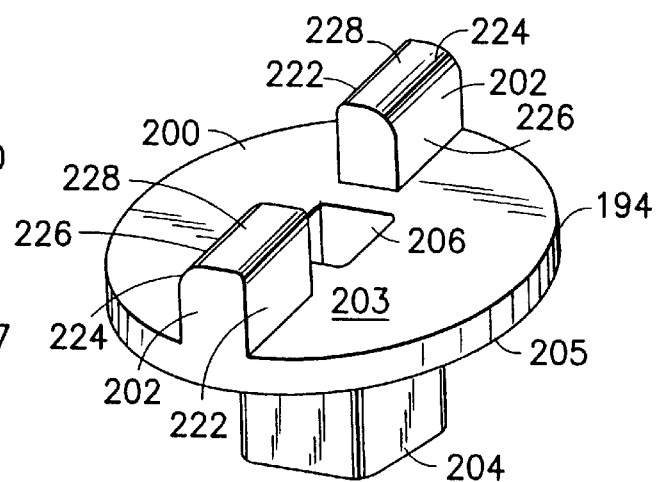
Figure 4:
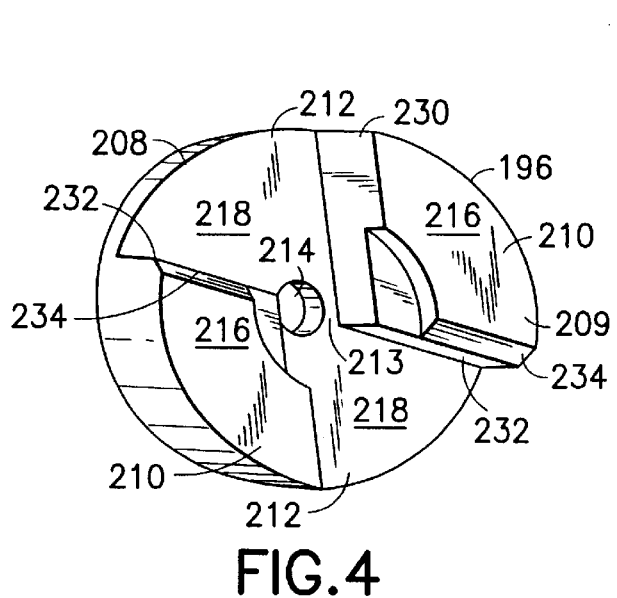
FIGS. 4–4A are respectively a perspective view and a top plan view of a female member of the main coupling in the drive system shown in FIG. 2.
Figure 4A:
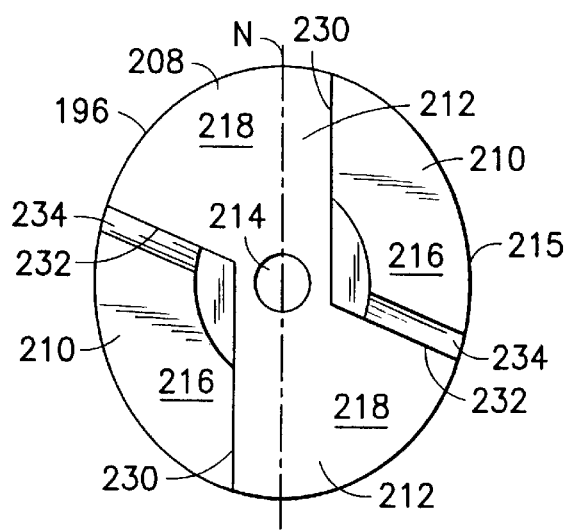

FIGS. 3–3B show three views of the male member 194 of the main coupling 134. FIG. 3 is a first perspective view of the male member 194, FIG. 3A is a bottom plan view and FIG. 3B is a second perspective view showing the male member 194 upside down. The male member 194 generally comprises a mid-body 200, an upper socket 204 and one or more spline tabs 202. The upper socket 204 connects the male member 194 to the lower drive shaft section 126. The spline tabs 202 engage the female member 196 to couple the male member 194 to the female member 196. In the preferred embodiment, the mid-body 200 has a general plate shape with a generally elliptical perimeter 207 (see FIG. 3A). The socket 204 projects from a top surface 205 of the mid-body 200 (see FIG. 3). The socket 204 has a substantially rectangular shape. The bore 206 in the socket 204 is substantially square and extends through the mid-body 200 (see FIG. 3A). The bore 206 is shaped to receive therein a mating portion 220 of the lower drive shaft section 126 which has a square cross-section. As shown in FIGS. 3A and 3B, the bottom surface 203 of the male member 194 is substantially flat except for two spline tabs 202 projecting downward therefrom. In the preferred embodiment, the spline tabs 202 have a general rectangular shape. The spline tabs 202 are located on the bottom 203 substantially diametrically opposite each other. The spline tabs 202 are aligned substantially parallel with the major axis M of the elliptically shaped mid-body 200. The spline tabs 202 are symmetrically offset relative to the major axis M of the mid-body 200. Looking down from the top, the spline tabs 202 are offset from the major axis M in the rotational direction the lower drive shaft section 126 rotates when the drive system 100 is energized. Thus, if the lower drive shaft section 126 rotates clockwise when the drive system 100 energized, the spline tabs 202 are offset clockwise relative to the major axis M. If the lower drive shaft section rotates counter-clockwise, then the spline tabs are offset counter-clockwise with respect to the major axis M. In the preferred embodiment, the spline tabs 202 are offset clockwise relative to the major axis M when looking down on the male member 196. (The perspective in FIGS. 3A and 3B looks up at the bottom of the male member 196 and hence the offset of the spline tabs 202 shown in these views is the mirror image (i.e. counter-clockwise) to that seen when looking down on the male member.) The leading face 222 of each spline tab 202 is substantially flat. Each spline tab 202 has a curved corner surface 224 connecting the trailing face 226 to the top 228 of the spline tab 202 (see FIGS. 3 and 3B). The male member 138 of the intermediate coupling 128 of the drive shaft assembly 112 (see FIG. 2A) is substantially similar to the male member 202 of the main coupling 134 depicted in FIGS. 3–3B and described above. Referring now to FIGS. 4 and 4A, the female member 196 of the main coupling 134 comprises a bottom section 208 and an upper section 209. The bottom section 208 is generally flat with an elliptical perimeter 215. In the center, the bottom section has a substantially round hole 214 for mounting the female member 196 to the transmission shaft 114. The upper section 209 of the female member 196 comprises two mismatched platforms 210 depending from the bottom section 208. The platforms 210 are located generally diametrically opposite each other. The two platforms 210 form two spline tab receiving slots 212 which communicate through an opening 213. As seen best in FIG. 4A, each platform 210 has a general wedge shaped configuration which tapers wider from the center to the perimeter 215 of the female member 196. The slots 212 complement the shape of the platforms 210. Hence, the slots 212 also radially flare out toward the perimeter 215 of the female member 196. The platforms 210 are disposed on the bottom section 208 in a mirror image, opposite hand arrangement (i.e. inversely symmetrical) with respect to the major axis N of the elliptically shaped bottom section 208 (see FIG. 4A) Each wedge shaped platform 210 has a butting face 230 and an adjoining second face 232. The butting faces 230 are aligned substantially parallel with the major axis N. The second faces 232 of the wedge shaped platforms 210 are substantially aligned with each other. The top surface 216 of each platform 210 is substantially flat. A chamfered section 234 connects the top surface 216 of each platform 210 to its second face 232. The bottom surfaces 218 of the slots 212 are also substantially flat. The female member 140 of the intermediate coupling 128 in the drive shaft assembly 112 (see FIG. 2A) is substantially similar to the female member 196 of the main coupling 134 shown in FIGS. 4 and 4A and described above.

Referring now to FIG. 2A, the female member 196 of the main coupling 134 is mounted to the transmission shaft 114 with the upper end 168 of the transmission shaft inserted into the round hole 214 of the female member 196. The upper end 168 of the transmission shaft 114 may be force fit in the hole 214 of the female member so that the female member is substantially fixed to the transmission shaft. In addition the female member 196 may also be staked or pinned to the transmission shaft 114 to further fix the female member thereto and prevent relative motion between the female member 196 and transmission shaft 114. The male member 194 of the main coupling 134 is mounted to the lower drive shaft section 126 with the square mating portion 220 of the shaft section 126 inserted in the socket 204 of the male member 194. The fit between the square mating portion 220 of the shaft section and the bore 206 of the socket 204 allows the male member to slide freely up and down on the shaft section 126. However, the square mating portion 220 interfaces with the square bore 206 in the socket 204 to prevent relative rotation between the male member 194 and the lower drive shaft section 126. In alternate embodiments, the interface between the lower drive shaft section and the socket of the male member may have any other suitable configuration so that the male member is free to slide along the shaft but not to rotate on the shaft (e.g. a key in a keyway rotationally locking the male member to the shaft but allowing the male member to slide axially on the shaft). The male member 194 is otherwise free to slide axially upon the lower shaft section 126, but is biased downwards by the main coupling spring 198. As shown in FIG. 2A, the main coupling spring 198 is a coil spring with its upper end 240 acting against the upper housing 12 and the lower end 242 acting against the top surface 205 of the male member 194. Upward movement of the male member 194 relative to the lower drive shaft section 126 compresses the spring 198 which applies a downward bias to the male member relative to the lower shaft section (the lower shaft section being fixed vertically relative to the upper housing 12). In alternate embodiments, the main coupling spring may comprise any other suitable resiliently flexible member acting to bias the male member downward relative to the lower drive shaft section. Still referring to FIG. 2A, when the upper housing 12 is in the down position, the male and female member 194, 196 are coupled, the spline tabs 202 of the male member 194 being located in the spline receiving slots 212 of the female member 196. The bottom surface 203 of the male member mid-body 200 rests against the top 216 of the raised platforms 210 of the female member 196. The wedge shaped receiving slots 212 in the female member 196 are wider than the spline tabs 202 on the male member 194 (see FIGS. 3A and 4A). Hence, the male member 194 may rotate somewhat relative to the female member 196 during operation of the drive system 100. The relative movement is stopped when the leading faces 222 on the spline tabs 202 contact the butting surfaces 230 of the corresponding raised platforms 210. Then the male and female members 194, 196 of the coupling 134 rotate in unison. Thus, the female member 196, which is fixed to the transmission shaft 114, rotates the transmission shaft 114 in unison with the male member 194 and with the lower drive shaft section 126 to which the male member is rotationally locked. The torque provided by the lower drive shaft section 126 during operation of the drive system 100 is thus transferred from the lower shaft section 126 across the main coupling 134, from the male member 194 to the female member 196, to the transmission shaft 114. The downward bias effected by the spring 198 on the male member 194 prevents the male member 194 from ratcheting upward relative to the female member 196 during rotation (arising from angular misalignment between the lower drive shaft section 126 and the transmission shaft 114) and inadvertently uncoupling the main coupling 134.

Figure 5:
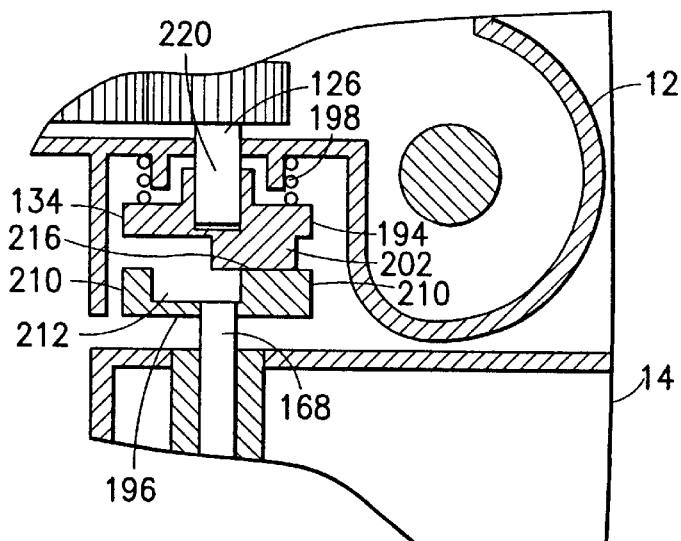
FIG. 5 is partial cross-sectional elevation view of the stand mixer shown in FIG. 1, showing the upper housing in the down position and the main coupling in the drive system in a decoupled position.

Referring now also to FIG. 2B, when the upper housing 12 is pivoted to its up position, the lower drive shaft section 126 (along with the rest of the drive shaft assembly 112 and the motor 110) is rotated up and away from the transmission shaft 114 held in the lower housing 14. As the lower drive shaft section 126 moves away from the transmission shaft 114, the male member 194 moves up with the lower shaft section relative to the female member 196 (stops (not shown) on the mating section 220 of the lower drive shaft section 126 prevent the male member 194 from sliding off the mating section 220). The spline tabs 202 are withdrawn from the slots 212 and the male member 194 is disengaged from the female member 196. Pivoting the upper housing 12 from its up position back to its down position, shown in FIG. 2A, returns the lower drive shaft section 126 to its operating position. The male member 194 of the main coupling 134 is rotated down with the lower drive shaft section 126 towards the female member 196. When the upper housing 12 is in the down position, the male member 194 contacts the female member 196 of the main coupling 134. If the spline tabs 202 on the male member 194 are substantially aligned with the receiving slots 212 in the female member 196, the spline tabs 202 are inserted into the slots 212 as shown in FIG. 2A coupling the male and female members 194, 196 when the upper housing 12 is lowered down. However, if the splines 202 on the male member 194 are misaligned with the receiving slots 212, then when the upper housing 12 is lowered down the spline tabs 202 come to rest on the top surface 216 of the platforms 210 on the female member 196 as shown in FIG. 5. In this case, when the upper housing 12 is lowered to its down position, the female member 196 displaces the male member 194 upward relative to the lower drive shaft section 126 and the upper housing 12. The upward displacement compresses the main coupling spring 198 which generates a downward bias on the male member 194. When the drive system 100 is energized, the lower drive shaft section 126 rotates and turns the male member 194 relative to the female member 196. The spline tabs 202 on the male member 194 slide on the top surface 216 of the platforms 210. When the relative rotation between the male and female members 194, 196 substantially aligns the spline tabs 202 with the receiving slots 212, the compressed spring 198 forces the male member down relative to the upper housing 12. The spring 198 inserts the now aligned splines 202 of the male member 194 into the receiving slots 212 of the female member 196 (see FIG. 2A). The spring 198 thus automatically couples the male and female members 194, 196 of the coupling 134 on-the-fly. The general wedge shape of the slots 212, the rounded trailing corners 224 of the splines 202 and the chamfered surface 234 on the platforms 210 (see FIGS. 3B and 4) cooperate to guide the spline tabs 202, which are moving relative to the slots 212, into the slots under the downward force of the main coupling spring 198. This guidance ensures that the spring 198 automatically couples the male and female members 194, 196 when the drive system 100 is energized. After the male and female members 194, 196 are coupled, the main coupling 134 operates as previously discussed to transfer torque from the lower drive shaft section 126 to the transmission shaft 114. Thus, the main coupling 134 is a self-aligning or otherwise an on-the-fly alignment coupling which automatically aligns and couples the male member 194 to the female member 196 when the user lowers the upper housing and operates the stand mixer.

The intermediate coupling 128 generally remains coupled when the upper housing 12 is either in the up (or moving towards the up) position as shown in FIG. 2B or in the down (or operating) position shown in FIG. 2A. The intermediate coupling 128 accommodates misalignment between the upper transmission system 116 and the quill shaft 120 of the motor 110. The intermediate coupling 128 thus prevents jamming and overheating of the motor 110 and upper transmission system 116 during operation of the stand mixer.

In addition, the intermediate coupling 128 may uncouple when the upper transmission system 116 offers high motive resistance, as in the case where the implement 24 (see FIG. 2) encounters a highly resistive media. This prevents damage to the drive system 100. After the media impeding rotation of the implement has been cleared from the implement, the intermediate coupling 128 is then automatically coupled by re-energizing the drive system 100. When the drive system 100 is re-energized, the male member 138 rotates relative to the female member 140 until substantially aligned therewith and then couples with the female member under the bias of the spring (not shown) or otherwise under the influence of gravity.

The present invention provides a stand mixer 10 with a self-aligning coupling which automatically interfaces the sections of the drive system 100 in the upper housing 12 to the sections in the lower housing 14 when the user lowers the upper housing 12 to its down position. In the prior art, the user had to manually align and lock the mating parts of couplings transferring power between housing sections which are movable relative to each other. Manual alignment and locking of the coupling had to be performed before the user energized the stand mixer. The coupling of the present invention eliminates the step of manually aligning the mating parts of the coupling when the housing section are returned to an operating position. Rather, in the present invention, the user merely returns the upper housing 12 to its normal (down) operating position and energizes the stand mixer 10. The self-aligning coupling 134 then automatically does the rest. The male and female members 194, 196 of the coupling 134 align and couple with each other as the stand mixer 10 operates.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. In a stand mixer comprising a drive shaft, a transmission shaft and a coupling, the drive shaft being rotatably held in a first housing, the transmission shaft being held in a second housing, the second housing being pivotably mounted to the first housing so that the first housing may be pivoted relative to the second housing, the coupling connecting the drive shaft to the transmission shaft when the first housing is in an operating position, wherein the improvement comprises:

the coupling comprising a first member, a second member and a spring, the first member being inserted into and intermeshed with the second member to transfer power between the drive shaft and the transmission shaft, wherein when the first housing is pivoted to the operating position the spring biases the first member against the second member to intermesh the first member with the second member.

2. A stand mixer as in claim 1, wherein when the drive shaft rotates the spring inserts the first member of the coupling into the second member to intermesh the first member with the second member on-the-fly.

3. A stand mixer as in claim 1, wherein the first member of the coupling has a seating surface with a tab depending therefrom, and wherein the second member of the coupling has a mating surface with a receiving slot formed therein, the tab being located in the receiving slot when the first member and second member of the coupling are intermeshed.

4. A stand mixer as in claim 3, wherein the first member of the coupling has two of the tabs depending from the seating surface and the second member of the coupling has two of the receiving slots, each one of the tabs being located in a corresponding one of the receiving slots when the first and second members of the coupling are intermeshed.

5. A stand mixer as in claim 4, wherein the tabs are disposed on the seating surface of the first member substantially diametrically opposite each other.

6. A stand mixer as in claim 4, wherein the mating surface of the second member has two raised platforms located generally diametrically opposite each other to form the two receiving slots therebetween, and wherein, each of the raised platforms has a general wedge shape disposed on the mating surface.

7. A stand mixer as in claim 1, wherein the first member of the coupling is adapted to slip on the second member to bring in contact leading faces on the first member with butting faces on the second member when the drive shaft rotates the first member relative to the second member.

8. A stand mixer as in claim 1, wherein the first member of the coupling has tabs projecting therefrom, the tabs sliding on a butting surface of the second member of the coupling when the drive shaft rotates the first member relative to the second member, and wherein, when the tabs are generally aligned with receiving slots in the butting surface of the second member the tabs are automatically inserted into the receiving slots by the spring biasing the first member into the second member.

9. A stand mixer as in claim 1, wherein the first member of the coupling has tabs projecting therefrom, the tabs butting a mating surface of the second member of the coupling and deflecting the spring when the tabs are misaligned with mating slots in the mating surface of the second member.

10. A stand mixer as in claim 1, wherein the spring displaces the first member of the coupling axially along the drive shaft to insert tabs on the first member into receiving slots in the second member and intermesh the first member with the second member.

11. A stand mixer as in claim 1, wherein the first member of the coupling is movably mounted to the drive shaft to slide axially relative to the drive shaft and wherein the first member is rotationally interlocked with the drive shaft to rotate substantially as a unit with the drive shaft.

12. A stand mixer as in claim 1, wherein the first member of the coupling is withdrawn from the second member when the first housing is pivoted away from the operating position.

13. A stand mixer comprising:
a lower housing;
an upper housing pivotably mounted to the lower housing so that the upper housing may be pivoted between a lowered position and a raised position, the upper housing having a drive shaft therein to drive a transmission shaft in the lower housing; and
an on-the-fly alignment coupling connecting the drive shaft to the transmission shaft when the upper housing is in a lowered position, the coupling comprising a keyed member movably mounted to the drive shaft, a keyway member fixedly mounted to the transmission shaft and having a keyway adapted to receive the keyed member therein, and a spring biasing the keyed member towards the keyway member;
wherein, when the upper housing is pivoted to the lowered position, the keyway member compresses the spring so that the spring forces the keyed member down and inserts the keyed member into the keyway member on-the-fly.

14. A stand mixer as in claim 13, wherein the keyed member has a center section with a mounting aperture formed therein, the mounting aperture being adapted to receive a drive portion of the drive shaft, and wherein the mounting aperture has internal sides to slidingly engage mating sides on the drive portion of the drive shaft so that the keyed member rotates in unison with the drive shaft and is substantially free to slide axially relative to the drive shaft.

15. A stand mixer as in claim 13, wherein the keyed member has a generally elliptical lower seating surface with two key tabs projecting therefrom, the two key tabs being located on the seating surface substantially diametrically opposite each other.

16. A stand mixer as in claim 13, wherein the keyway in the keyway member has two outer key receiving areas located generally diametrically opposite each other, each key receiving area having a generally flared shape flaring radially outwards.

17. A stand mixer as in claim 13, wherein the keyed member is adapted to slide upon the keyway member when keys on the keyed member are misaligned with the keyway in the keyway member and the drive shaft rotates the keyed member relative to the keyway member, and wherein when rotation of the keyed member relative to the keyway member generally aligns the keys with the keyway the spring inserts the keyed member into the keyway member on-the-fly.

18. A stand mixer comprising:
a drive shaft mounted in an upper housing;
a transmission shaft driven by the drive shaft, the transmission shaft being held in a lower housing, the upper housing being pivotably mounted to the lower housing to be pivoted between a lowered position and a raised position;
a first coupling mounted on the drive shaft to couple an upper drive shaft portion to a lower drive shaft portion; and
a second coupling drivingly connecting the drive shaft to the transmission shaft, the second coupling comprising a first coupler, a second coupler and a spring, the first coupler being mounted to the drive shaft, the second coupler being mounted to the transmission shaft and being intermeshed with the first coupler to transfer power from the drive shaft to the transmission shaft, wherein the spring is adapted to be deflected when pivoting the upper housing to the lowered position and wherein the deflected spring biases the first coupler against the second coupler to mesh the first coupler with the second coupler.

19. A stand mixer as in claim 18, wherein the first coupling comprises two movably intermeshed members adapted to transfer torque from the upper drive shaft portion to the lower drive shaft portion when the upper drive shaft portion and the lower drive shaft portion are generally misaligned relative to each other.

20. A stand mixer as in claim 18, wherein when the drive shaft rotates and the first coupler of the second coupling is misaligned relative to the second coupler so that the first coupler contacts but is not meshed with the second coupler, the first coupler and second coupler are adapted to slip relative to each other, and wherein the spring meshes the first coupler with the second coupler when rotation of the first coupler relative to the second coupler generally aligns the first coupler with the second coupler.

* * * * *